(12) United States Patent
Byrne

(10) Patent No.: US 11,722,375 B2
(45) Date of Patent: *Aug. 8, 2023

(54) SERVICE CONTINUITY FOR NETWORK MANAGEMENT SYSTEMS IN IPV6 NETWORKS

(71) Applicant: T-Mobile USA, Inc., Bellevue, WA (US)

(72) Inventor: Cameron Byrne, Seattle, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,653

(22) Filed: Sep. 12, 2022

(65) Prior Publication Data

US 2023/0006883 A1 Jan. 5, 2023

Related U.S. Application Data

(63) Continuation of application No. 17/487,718, filed on Sep. 28, 2021, now Pat. No. 11,496,367, which is a continuation of application No. 16/899,340, filed on Jun. 11, 2020, now Pat. No. 11,165,652.

(51) Int. Cl.
| | |
|---|---|
| *H04L 41/0896* | (2022.01) |
| *H04L 43/0829* | (2022.01) |
| *H04L 69/167* | (2022.01) |
| *H04L 69/16* | (2022.01) |
| *H04L 69/326* | (2022.01) |

(52) U.S. Cl.
CPC ...... *H04L 41/0896* (2013.01); *H04L 43/0835* (2013.01); *H04L 69/161* (2013.01); *H04L 69/167* (2013.01); *H04L 69/326* (2013.01)

(58) Field of Classification Search
CPC ............ H04L 41/0896; H04L 43/0835; H04L 69/161; H04L 69/167; H04L 69/326
USPC .......................................................... 709/223
See application file for complete search history.

(56) References Cited

U.S. PATENT DOCUMENTS

| | | | |
|---|---|---|---|
| 7,555,562 B2 * | 6/2009 | See | H04L 43/026 709/239 |
| 7,712,015 B1 * | 5/2010 | Li | H04L 1/0061 714/781 |
| 7,955,674 B2 | 6/2011 | Sengupta et al. | |
| 8,270,608 B2 | 9/2012 | Reeds, III | |
| 8,307,266 B2 | 11/2012 | Sethuraman et al. | |
| 8,391,302 B1 * | 3/2013 | Kommidi | H04L 1/0027 370/401 |
| 8,843,645 B2 * | 9/2014 | Annamalaisami | H04L 63/1458 709/224 |
| 9,800,548 B2 | 10/2017 | Jordan et al. | |
| 9,992,093 B2 | 6/2018 | Monk, IV et al. | |
| 10,178,073 B2 | 1/2019 | Shaposhnik et al. | |

(Continued)

*Primary Examiner* — David P Zarka
(74) *Attorney, Agent, or Firm* — Brownstein Hyatt Farber Schreck, LLP

(57) ABSTRACT

Systems and methods for reducing bandwidth loss in IPv6 packet switching networks. A network appliance is configured to sample IPv6 packets and mirror sampled packets to a working memory or memory structure, such as a queue. A transport layer payload is extracted from each sampled packet and a transport layer checksum validation operation is performed. Upon detecting an error, the network appliance updates a dropped packet rate or other metric.

20 Claims, 4 Drawing Sheets

(56) References Cited

U.S. PATENT DOCUMENTS

| | | | |
|---|---|---|---|
| 10,248,404 B2* | 4/2019 | Garman | H04L 67/34 |
| 10,558,453 B1 | 2/2020 | Bhaskar et al. | |
| 10,795,791 B2 | 10/2020 | Gantt et al. | |
| 11,165,652 B1* | 11/2021 | Byrne | H04L 69/161 |
| 11,496,367 B2* | 11/2022 | Byrne | H04L 69/40 |
| 2004/0090988 A1 | 5/2004 | Masputra | |
| 2004/0203897 A1* | 10/2004 | Rogers | H04W 16/18 |
| | | | 455/446 |
| 2008/0034119 A1 | 2/2008 | Verzunov et al. | |
| 2012/0300648 A1* | 11/2012 | Yang | H04L 1/20 |
| | | | 370/252 |
| 2015/0180774 A1* | 6/2015 | Loach | H04L 61/2514 |
| | | | 370/392 |
| 2016/0261503 A1* | 9/2016 | Burgess | H04L 43/0888 |
| 2016/0352459 A1 | 12/2016 | Sato et al. | |
| 2017/0063704 A1* | 3/2017 | Krinsky | H04W 4/029 |
| 2018/0262432 A1 | 9/2018 | Ozen et al. | |

* cited by examiner ns in IPv6 Networks in IPv6 Networks
SERVICE CONTINUITY FOR NETWORK MANAGEMENT SYSTEMS IN IPV6 NETWORKS

CROSS-REFERENCE TO RELATED APPLICATION

This application is a continuation patent application of U.S. patent application Ser. No. 17/487,718, filed Sep. 28, 2021 and titled "Service Continuity for Network Management Systems in IPv6 Networks," which is a continuation patent application of U.S. patent application Ser. No. 16/899,340, filed Jun. 11, 2020, and titled "Service Continuity for Network Management Systems in IPv6 Networks," now U.S. Pat. No. 11,165,652, the disclosures of which are hereby incorporated by reference herein in their entireties.

FIELD

Embodiments described herein relate to computer networks and, in particular, to maintaining service continuity for network management systems leveraging network transport metrics of IPv4 networks shifting to IPv6 network technologies.

BACKGROUND

Computing networks are regularly monitored by software and hardware tools for maintenance and performance continuity purposes. Network monitoring tools implemented in physical networking appliances (e.g., routers) configured for legacy IPv4 networks leverage header checksums for error detection at the network layer.

However, IPv6 intentionally omits header checksums at the network layer and instead relies on error checking/verification operations at the transport layer and the link layer. As a result, as adoption of and demand for IPv6 support advances, legacy network monitoring tools must be replaced, updated, or phased-out. For organizations managing large-scale wide-area networks, replacing and/or upgrading monitoring tools can be cost prohibitive.

SUMMARY

Embodiments described herein relate to methods for reducing bandwidth waste when operating a network appliance in a computer network such as an IPv6 network. Such embodiments may also be leveraged to support existing network management systems that leverage network layer statistics and data items to trigger one or more operations or workflows. In particular, in one embodiment, a method includes operations of: receiving a packet at an input of the network appliance; mirroring the packet to a working memory as a duplicate packet; forwarding the packet to a destination address of the packet extracting a transport layer payload from the duplicate packet; verifying a checksum of the extracted transport layer payload to determine whether an error may be present in the extracted transport layer payload; and, in response to determining that the error may be present, updating a dropped packet rate of the network appliance.

Related and additional embodiments may include a configuration in which the transport layer payload conforms to a transport layer protocol, such as the Transmission Control Protocol ("TCP") or the User Datagram Protocol ("UDP").

Related and additional embodiments may include a configuration in which extracting the transport layer payload from the duplicate packet may be performed when the network appliance is idle. Other examples may include a configuration in which extracting the transport layer payload from the duplicate packet occurs at an interval which may be based, at least in part, on the dropped packet rate.

In some examples, the method can advance by alerting a network management system, communicably coupled to the network appliance, upon determining that the dropped packet rate satisfies a threshold. The network management system can be local to the network appliance (e.g., a separate software process executing over a processor of the network appliance) or may be remote to the network appliance.

Some embodiments described herein take the form of a method for reducing bandwidth waste when operating a network appliance in an IPv6 computer network. Such methods can include operations such as: receiving an IPv6 packet at an input of the network appliance from a source; determining that an interval has lapsed and, in response mirroring the IPv6 packet as a duplicate packet; and adding the duplicate packet to a processing queue. Thereafter, iteratively, the method can advance by: popping a respective duplicate packet from the processing queue and extracting a transport layer payload from that duplicate packet; verifying a checksum of the extracted transport layer payload and, in response to a failed validation of the checksum, updating a dropped packet rate associated with the source; and, upon determining that the dropped packet rate satisfies a threshold, throttling IPv6 packets received from the source.

In some embodiments, throttling IPv6 packets received from the source includes dropping all IPv6 packets received from the source.

In certain configurations and architectures, updating the dropped packet rate includes: determining a first rate of IPv6 packets received from the source; determining a second rate of duplicate packets popped from the processing queue that fail validation; determining a third rate based on the first rate and the second rate; and setting the dropped packet rate associated with the source to the third rate. In some examples, the third rate can be determined by scaling the second rate by the first rate.

Certain embodiments described herein can take the form of a network appliance for a packet switching network configured for IPv6 addressing. The network appliance can include at least an input port, a memory configured to store executable instructions, and a processor operably coupled to the memory. The processor can be configured to access the memory to retrieve the executable instructions to instantiate an instance of a network service application. The network service application can be configured to receive a set of packets via the input port and sample the received packets at a sampling rate. In addition, for each sampled/mirrored packet, the network service application can be configured to determine whether a transport layer payload of the mirrored packet fails a checksum validation. Likewise, for each determined failed checksum validation, the network service application can be configured to update an IPv4 packet loss rate metric accessed by one or more network management systems.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
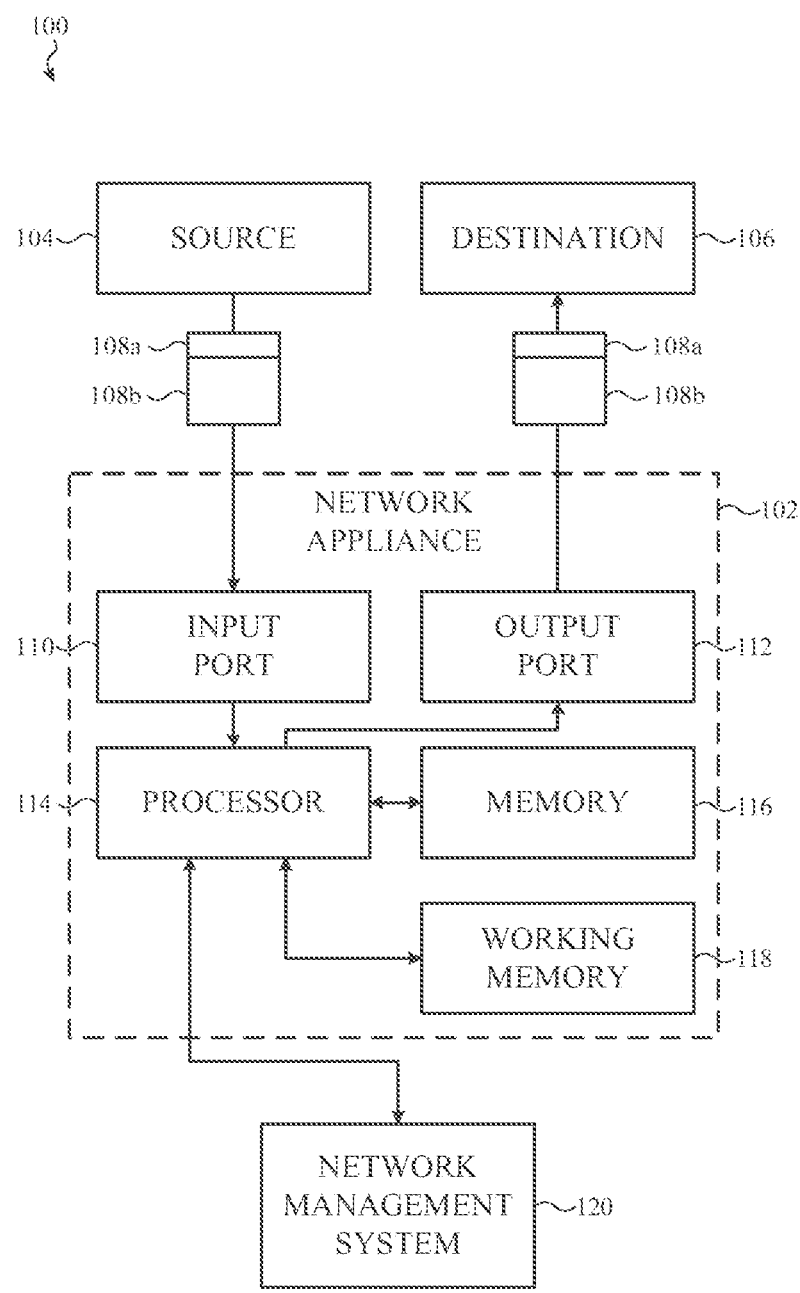
FIG. 1 depicts a system diagram of a network appliance, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to computer networks, and in particular, to systems and methods for instrumenting legacy network transport performance metric and management systems (herein, simply, "network management systems") configured for use with network layer checksums with transport layer checksums and/or other higher-layer error data. As a result of these constructions, deployed systems configured to monitor Internet Protocol version 4 ("IPv4") network transport metrics can continue to operate to additionally monitor Internet Protocol version 6 ("IPv6") network transport metrics.

In addition, systems described herein can be leveraged to recover at least a portion of bandwidth lost in conventional IPv6 systems that prioritize packet forwarding speed (e.g., by reducing router computational overhead) over network layer error correction. More specifically, as may be appreciated by a person of skill in the art, conventional IPv6 packet routing systems rely on link layer and transport layer error detection only. Link layer checksum verification can be used to detect physical network transmission errors (e.g., which may be caused by faulty equipment or transmission media).

Similarly, transport layer error detection (performed at a destination device) may be relied upon to detect data corruption in datagram payloads and/or network layer headers. However, despite that data corruption and logical errors within a datagram payload or a network layer header (e.g., an incorrect source or destination address) are intentionally ignored/discarded by destination devices of a conventional IPv6 network, bandwidth and computational overhead is required to forward those packets to the identified destination.

More simply, as a result of systems described herein, bandwidth utilization of IPv6 networks can be improved by dropping certain packets with payloads containing errors at the network layer and, in addition, existing network monitoring tools and automated network management and maintenance workflows configured to receive IPv4 checksum validation alarms as input can continue to operate, uninterrupted, while transitioning a network and its respective network appliances to IPv6. As may be appreciated by a person of skill in the art, systems and methods described herein dramatically simplify process(es) associated with updating network management/monitoring systems and workflows to quickly react to transport errors, from the network level, in IPv4 and IPv6 networks.

For example, a packet switching network can include a number of routers and switches each configured for IPv4 addressing. Upon receiving an IPv4 packet, a router in the network verifies that a network layer error has not occurred by calculating a ones' complement sum of each header word, including a received checksum. If the ones' complement of the calculated sum is non-zero (or, alternatively, if the sum equals 0xFFFF), the router determines that a transmission error and/or formatting error has occurred, and drops the packet.

In response to a dropped packet, in some constructions, a router increments an internal error counter, updates one or more statistics or metadata, and/or generates a message, signal, or alarm to another system or process, such as a network management system, to report the dropped packet. Such a signal can be referred to as an "error signal" or an "alarm." An alarm can be directed to any suitable instance of software executing on a processor of the router and/or can be directed to a separate appliance or application within the packet switching network. For example, an alarm (and/or metadata) can be displayed in a graphical user interface of a network management system for review by a network operations manager.

In some cases, in response to receiving an alarm relating to dropped packets or other transmission errors at the network level, one or more network management or maintenance workflows can be automatically triggered. In one simple example, if a dropped packet rate reported by a particular router or switch across a particular link exceeds a threshold, a workflow may be triggered that causes the router, and/or another appliance such as a switch, to reboot or power cycle.

In another example, if a packet drop rate for a given network appliance exceeds a threshold, certain resource utilization metrics (e.g., processor utilization, memory utilization, and so on) may be captured and/or sampled from that network appliance to determine whether the network appliance has appropriate resources to process all incoming packets. In another example, if a packet drop rate for a given network appliance increases beyond a threshold, a workflow may be triggered to determine if that network appliance was recently updated (e.g., configuration change, firmware update, and so on) and, further, to roll back the update automatically.

In another example, if an error rate/packet drop rate associated with a particular source address exceeds a threshold, a workflow may be triggered that causes the router to reject or deprioritize packets from that address. In yet another example, if an error rate associated with a particular link between appliances in a packet switching network exceeds a threshold, one or more appliances associated with that link may be automatically rebooted and/or a service ticket may be automatically generated.

It may be appreciated that the foregoing simplified examples are not exhaustive of the automatic operations, tasks, and workflows that may be triggered in response to detecting one or more IPv4 packet transport errors. More generally, any suitable network or device management operation may be possible. Further, it may be appreciated that a packet switching network is merely one example network in which packets are exchanged or transported from appliance to appliance.

Continuing the preceding example, the packet switching network may be upgraded to support IPv6 routing, which as noted above intentionally omits network layer checksums for packet header integrity validation. Instead, IPv6 networks rely on higher-layer and lower-layer checksums, such as checksums verified at the transport layer or the link layer.

As such, none of the aforementioned example workflows that leverage packet loss/IPv4 checksum data will be triggered promptly if a received IPv6 packet suffers a transport error. In other words, existing network level triggers and workflows (and/or operations associated therewith) configured to react to IPv4 checksum errors are not capable to respond to IPv6 transport errors.

As a result, performance of a packet-switching network can suffer while workflows to automatically perform network maintenance operations (e.g., based on real-time network performance statistics) are updated to support IPv6. In another non-limiting phrasing, because IPv6 transport errors are not reported at the network layer, workflows that are configured to consume network layer checksum-based verification data must be updated.

In other words, as IPv6 adoption advances, such workflows quickly become obsolete and networks that previously automatically self-corrected issues causing transport errors will require manual maintenance and monitoring until new IPv6 compatible tools and automations can be deployed.

Embodiments described herein account for these and other issues by instrumenting existing workflows triggered by IPv4 checksum verification data with transport layer checksum data extracted from Transmission Control Protocol ("TCP") and/or User Datagram Protocol ("UDP") payloads of IPv6 packets at a variable sampling rate. As a result, individual networking appliances (e.g., routers, switches, and the like) can report transport data errors to existing network management systems and such systems can continue to operate, uninterrupted, while upgrades and updates to support IPv6 are performed.

As may be appreciated by a person of skill in the art, embodiments described herein can provide for rapid identification of a source, with a packet switched network, of a network fault. In other cases, embodiments described herein can provide for multi-protocol error reporting on a per-appliance basis without affecting latency, jitter, or other data transfer characteristics.

In particular, transport level checksum data from TCP and UDP payloads (among other protocols) of IPv6 packets can be sampled at a selected and/or variable sampling rate, stored in a queue or other memory structure, and validated at a later time by the appliance that routed each packet. Upon detecting a TCP or UDP checksum validation error, the appliance can update an internal dropped packet count (or other statistic or metadata) and/or generate an alarm directed to a network management system communicably coupled to that appliance. As a result of this construction, each appliance in a packet switching network or other internetworking topology can report multi-protocol aggregated transport statistics and/or protocol-specific transport statistics.

For example, in an embodiment, a router of a packet switching network is configured to receive both IPv4 packets and IPv6 packets. As described above, the router may maintain and regularly update dropped packet counts when an IPv4 packet fails a network level header checksum validation operation. In addition, the router can maintain and regularly update dropped packet counts when an IPv6 packet contains a TCP or UDP payload that, in turn, includes a transport layer checksum that fails validation.

In this example, the router can report to a network management system one or more packet drop counts including, without limitation: a dropped packet rate for IPv6 packets; a dropped packet rate for IPv4 packets; an aggregate dropped packet rate for both IPv6 and IPv4 packets; and so on. As a result of the availability of these statistics, and in particular multiprotocol aggregate statistics, the network management system can present more accurate and complete visibility into operation of that router within the network to network operations personnel. In addition, as noted above, the network management system can automatically perform one or more workflows in response to more accurate aggregate data.

For example, at a given time, the router may receive some quantity of IPv6 packets and some quantity of IPv4 packets. In a conventional construction, the router verifies each header checksum of each IPv4 packet, and can readily detect transport errors that may be caused by network or router issues such as, but not limited to: over-allocation of the router's computing resources (e.g., processor, memory, and so on); traffic volume; misconfiguration; and so on. In the example conventional configuration, however, because IPv6 packets do not include a header checksum, IPv6 packets with malformed data will either be detected and discarded at the link layer (as dropped frames typically resulting from physical transmission errors) or will be detected, and rejected, at the transport layer by a destination device, which may be an unintended destination device if the IPv6 header contains errors. As a result, conventional IPv6 systems do not have visibility at the network layer.

These foregoing and other embodiments are discussed below with reference to FIGS. 1-4. However, those skilled in the art will readily appreciate that the detailed description given herein with respect to these figures is for explanation only and should not be construed as limiting.

FIG. 1 depicts a system diagram of a network appliance, such as described herein. The network appliance is communicably coupled to, and a portion of, a packet switching network 100. In the illustrated embodiment, the network appliance is identified as the network appliance 102.

The network appliance 102 can be any suitable network appliance configured to communicably couple to and/or participate in a packet switching network such as the packet switching network 100. Examples include but are not limited to switches, routers, firewalls, gateways, and the like.

The packet switching network 100 can be configured to exchange packetized information between nodes of that network. In some cases, the packet switching network 100 can be a multiprotocol label switching ("MPLS") network, whereas in other cases, the packet switching network 100 can be configured to implement IPv6 and/or IPv4 addressing. A person of skill in the art will readily appreciate that a number of suitable packet switching or data exchange systems can leverage the systems and methods described herein.

The network appliance 102 is configured to receive packets from a source 104. Upon receiving a packet 108 from the source 104, the network appliance 102 forwards the packet 108 to a destination 106 that is defined by the packet 108 itself. In particular, the packet 108 includes a network layer header 108a and a payload 108b. The network layer header 108a identifies the source 104 and the destination 106 and the payload 108b includes transport layer information intended to be consumed by an electronic device or network appliance associated with the destination 106.

More specifically, the network appliance 102 includes an input port 110 and an output port 112. The input port 110 receives the packet 108 from the source 104 and, correspondingly, the output port 112 forwards that packet to the destination 106.

The network appliance 102 can be implemented in hardware or software and may be associated with one or more computational resources that can be allocated to perform, coordinate, or schedule one or more tasks or operations of the network appliance 102. The resource allocations assigned to the network appliance 102 can include virtual and/or physical hardware. For simplicity of description, the network appliance 102 described below is a physical hardware appliance, but it may be appreciated that, in other implementations, the network appliance 102 may be partially or entirely virtualized, containerized, or otherwise implemented.

In the illustrated embodiment, the network appliance 102 includes a processor 114 and a memory 116. The memory 116 can be a nonvolatile memory configured to store executable instructions and other computational assets that can be accessed by the processor 114. In particular, the processor 114 can be configured to access the memory 116 in order to retrieve one or more executable instructions that, when executed by the processor 114 cause the processor 114 to instantiate an instance of software configured to provide a networking service. In some embodiments, the instance of software can be referred to as a network service application. A network service application, such as described herein can be configured to leverage resources allocated to the network appliance 102 in order to provide a networking function such as routing, packet shaping, firewall functions, and so on.

The processor 114 can leverage a working memory 118 to support one or more instances of software, such as a network service application. The working memory 118 can be a volatile memory that can be accessed and used by the processor 114 at high speed.

While performing a networking function such as routing, the processor 114 can maintain one or more metrics and/or counters that describe one or more operational characteristics of the network appliance 102. For example, as noted above, the network appliance 102 can be configured as a router and may maintain one or more dropped packet counters.

The metric(s) maintained by the processor 114 can be accessed via an application programming interface ("API") leveraged by a network management system 120. The network management system 120 can be configured to monitor performance of the network appliance 102 and can be configured to automatically perform one or more tasks or operations and/or trigger one or more workflows in response to and based on those metrics.

For example, as noted above, the network management system 120 can be configured to monitor a dropped packet rate of the network appliance 102. If the dropped packet rate exceeds a threshold, the network management system 120 can send an instruction to the network appliance 102 to change one or more operational parameters of its operation. In one example, the network appliance 102 can throttle traffic from a particular source and/or can throttle traffic to a particular destination and/or can stop transporting data across a particular link, and so on. In other cases, physical hardware operations may be performed in response to an instruction received by the network appliance 102 from the network management system 120. For example, the network appliance 102 may be rebooted if a dropped packet rate is too high.

As with other embodiments described herein, the network appliance 102 can be configured to extract the payload 108b from the packet 108 in order to evaluate whether that packet's transport layer datagram contains a checksum error. More specifically, the network appliance 102, or more particularly, the processor 114 of the network appliance 102, can be configured to receive IPv6 packets from the source 104. Once an IPv6 packet is received, the processor 114 can extract the payload 108b and can perform a checksum validation operation against that payload 108b prior to forwarding the payload 108b to the destination 106.

Upon determining that the payload 108b fails checksum validation, the processor 114 can drop the packet 108, preventing the packet 108 from being delivered to the destination 106. As may be appreciated by a person of skill in the art, the IPv6 protocol is intentionally designed without any requirement that a network layer appliance, such as a router, perform a checksum validation. Instead, IPv6 relies on downstream devices to perform transport layer checksum validations and, in turn, to drop erroring datagrams. This, as described above, wastes bandwidth by forwarding packets that contain errors and will eventually be dropped. As such, embodiments described herein can recover that bandwidth by not forwarding packets containing transport layer errors.

In other embodiments, the network appliance 102 may conform to the IPv6 protocol in that the packet 108 may be immediately forwarded to the destination 106. In these examples, the packet 108 may be mirrored (duplicated) to the working memory 118. In particular, the processor 114 can duplicate the packet 108 into a queue or other memory structure within the working memory 118. Thereafter, duplicate packets can be analyzed as described above and checksum validation failures can be used to inform changes to one or more metrics reported by the network appliance 102 to, as one example, the network management system 120.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, as noted above, it may be appreciated that any suitable network layer appliance or set of appliances can leverage the systems and methods described herein to recover bandwidth otherwise lost due to IPv6 implementations that rely on transport layer and link layer checksum validation to drop packets from particular sources and/or directed to particular destinations. Example network appliances that can leverage systems and methods described herein include but are not limited to: routers; firewalls; switches; gateways; bridges; and so on.

More particularly, a network appliance as described herein can be configured to facilitate continuity of service to one or more network monitoring systems. For example, as noted above, an example network monitoring or management system can be configured to leverage network layer packet transport statistics (e.g., packet drop rates) to inform one or more routing decisions. For example, if an IPv4 link coupling a first router to a second router begins to fail (as indicated by an increase in dropped packets), a network management system communicably coupled to each router may be configured to cause either or both the first router or the second router to disable that link until maintenance and/or diagnostics can be performed.

However, as noted above, because IPv6 packets do not contain any network layer checksums, network layer appliances do not, by design, make any determinations about the validity of data contained in a received IPv6 packet—such packets are simply forwarded according to the destination address which, in turn, is relied upon to reject the transport layer datagram for failing checksum validation. As noted above, forwarding such packets that contain errors wastes IPv6 bandwidth that might otherwise be allocated to other packets. Bandwidth waste may be a greater concern in particularly large packet switching networks, as a single error may be forwarded by multiple routers before that packet is rejected at its destination.

As such, embodiments described herein inspect transport layer payloads at network layer appliances in order to glean information about whether those payloads contain errors. If an error in the transport layer payload is detected, then a packet can be dropped in lieu of being forwarded along to the packet's original destination. In these examples, networking appliances configured to forward IPv6 packets can buffer IPv6 packets received at input ports thereof in order to inspect transport layer payloads for checksum validation failures. If a particular packet fails a checksum validation of its payload, that packet can be rejected by the appliance and a dropped packet metric can be incremented.

In other embodiments, as described above, a network appliance configured for IPv6 networking/addressing can be configured to sample IPv6 packets at a particular sampling rate. In these examples, IPv6 packets sent through a particular link can be mirrored to a working memory (also referred to herein as a processing queue) at a particular rate. The rate may be based on an interval or the rate may be based on a packet count. In other examples, the rate may be based on both an interval and a packet count. For example, a sampling rate in some embodiments may be one packet sampled for every ten packets received. In other examples, one packet may be sampled every two seconds. In yet other examples, a packet may be sampled at least once every one hundred packets and at least every five seconds. A person of skill in the art will readily appreciate that these example sampling rate bases are not exhaustive. In other embodiments, other means of selecting or modifying a sampling rate may be used.

Once one or more packets are sampled, a separate process executing as an instance of software supported by a processor and/or one or more memory allocations of or available to the network appliance can iteratively or otherwise extract transport layer payloads from enqueued/mirrored packets. The same or a different process can thereafter perform a checksum validation operation against those mirrored packets to determine whether the original packet (which has already been forwarded to its destination) contained an error. This delayed error recognition can be used to update one or more dropped packet metrics stored by and/or reported by the network appliance. As a result, a network management system in communication with the network appliance can determine whether to perform one or more network maintenance operations (e.g., triggering one or more predefined workflows). For example, as noted above, the management system may be configured to instruct the network appliance to throttle traffic transported across a link exhibiting high dropped packet rates. In some cases, traffic from a particular source, directed to a particular destination, and/or transported along a particular link, can be throttled entirely; future packets may be dropped regardless whether such packets contain a transport layer error or not.

In some examples, a network appliance as described herein can be configured for IPv6 over IPv4 operation in which IPv6 packets are encapsulated in IPv4 packets. In these examples, the network appliance can be configured to inject an intentionally incorrect network layer header checksum upon determining that the encapsulated IPv6 packet fails a transport layer checksum validation operation. As a result of these operations, the IPv4 packet encapsulating the IPv6 packet can be dropped at the network layer (because it will fail IPv4 checksum validation).

These foregoing examples are not exhaustive of the various techniques that can be leveraged by a system as described herein to instrument IPv4-compliant network diagnostic systems, such as network management systems, with IPv6 error information. A person of skill in the art may readily appreciate that any suitable operation can be performed to improve network performance if a greater quantity of error information is presented to existing, well-tested, and robust automated network management systems.

As such, generally and broadly, it may be appreciated that embodiments described herein leverage higher-layer checksum validation checks to inform network layer operations, diagnostics, and maintenance. In some cases, IPv6 transport layer checksum validation failures can be added to IPv6 dropped packet statistics. In other cases, IPv6 transport layer checksum validation failures can be prorated based on a sampling rate in order to approximate and/or infer a true error rate. For example, if one error is detected per ten packets sampled, a 10% error rate can be predicted presuming errors conform to a normal distribution. In other cases, other distributions may be presumed. In yet further embodiments, sampling rates can be increased or decreased in a deterministic manner. For example, as error rates increase, sampling rates can likewise increase. In some cases, a system as described herein can be configured to transition from a mirroring or sampling mode into a buffering mode in which all IPv6 packets are processed as described herein (e.g., transport layer payloads are extracted and are validated).

In yet further embodiments, packets may be mirrored to other networking appliances. For example, a dedicated processing queue can be maintained at a dedicated network appliance. In such examples, multiple appliances can communicate with a single appliance configured to receive mirrored packets and to detect errors in transport layer payloads thereof. In such examples, the dedicated appliance can be communicably coupled to (and/or may be) a network management system as described herein.

In view of the foregoing, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
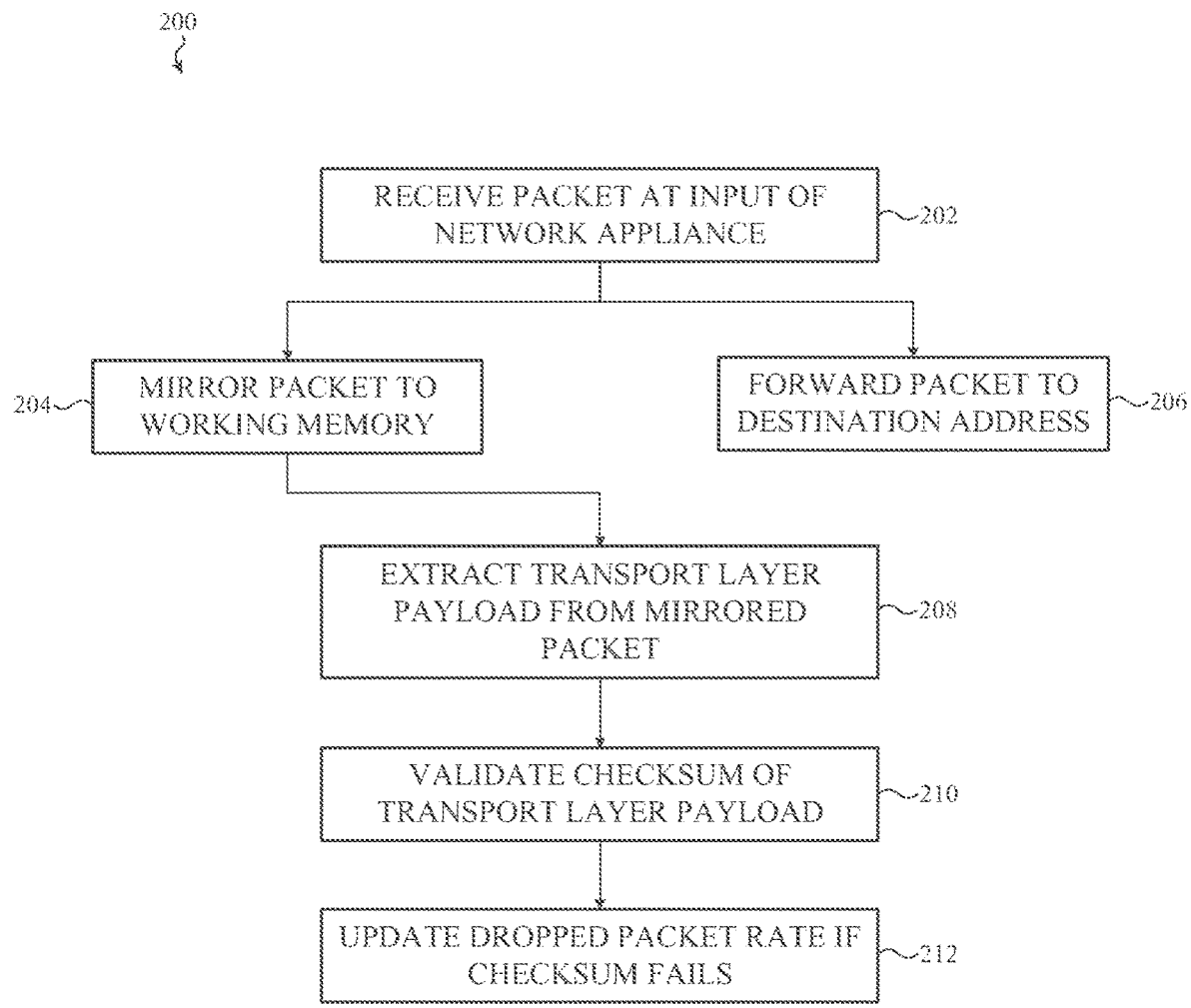
FIG. 2 is a flowchart depicting example operations of a method of operating a network appliance in a packet switching network, such as described herein.
Figure 3:
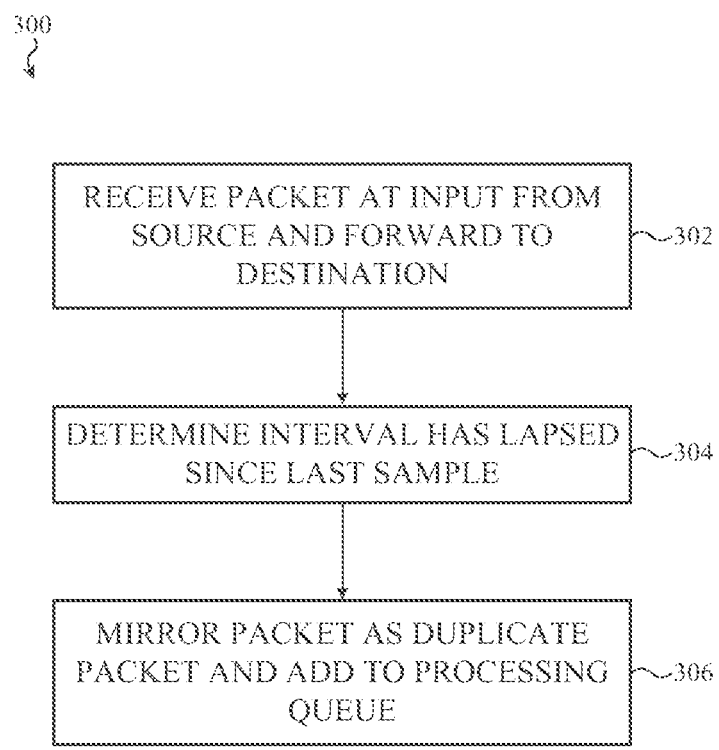
FIG. 3 is a flowchart depicting example operations of a method of sampling IPv6 packets received at an input of a network appliance in a packet switching network, such as described herein.
Figure 4:
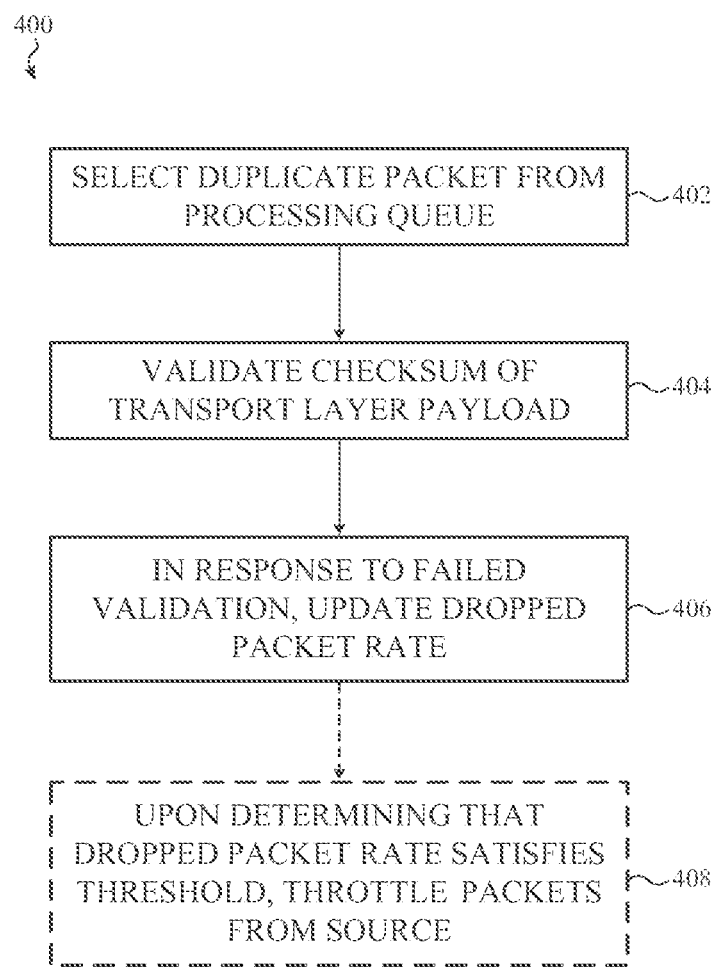
FIG. 4 is a flowchart depicting example operations of a method of processing sampled IPv6 packets to recover bandwidth in a packet switching network.

Generally and broadly, FIGS. 2-4 are flowcharts depicting various operations associated with a system described herein. In particular, these methods and operations depicted and described serve to reduce bandwidth waste and/or to increase service continuity for existing/legacy network management systems configured to inform one or more of their operations based on IPv4 metrics.

For example, FIG. 2 is a flowchart depicting example operations of a method of operating a network appliance in a packet switching network, such as described herein. The method 200 can be performed, in whole or in part, by a network appliance and/or a network service application instance, such as described herein. In some example constructions, a network appliance is a router and/or a network service application performs a routing function.

As noted with respect to other embodiments described herein, a network appliance can include a housing that encloses and supports one or more operational components often referred to as computing resources. Such computing resources can include a processor and a memory. The memory in many example constructions can take multiple forms such as a persistent memory suitable for storing executable instructions that can be accessed by the processor to instantiate one or more purpose-configured instances of software that may, in some embodiments, perform or facilitate one or more virtual or physical networking functions. Another example memory is a working memory that can be communicably coupled to the processor and may be leveraged by the processor when instantiating software as described herein and as may be known to a person of skill in the art.

A network appliance as described herein may further include, in some examples, one or more inputs and/or one or more outputs. Conventionally, such inputs and outputs are referred to as input ports and output ports. The input and output ports of a network appliance can be communicably coupled to the processor and/or to the memory and can be configured to physically and/or communicably couple to one or more other networking appliances.

The method 200 includes operation 202 at which a packet is received at an input port of a networking appliance. The packet can confirm to IPv4 addressing or IPv6 addressing. For simplicity of description, however, the packet as described in reference to this embodiment is presumed to confirm to IPv6 addressing.

Upon receiving the packet at operation 202, the method 200 advances to two operations in parallel or, in some embodiments, in sequence. In particular, the method 200 advances to operation 204 to mirror the packet received at operation 202 to working memory. In these examples, as described above, mirroring a packet is an operation in which a packet is duplicated from one memory location to another.

The method 200 can further advance from operation 202 to operation 206 at which the packet received at operation 202 is forwarded to a destination address defined by the packet itself.

The method 200 advances from operation 204 to operation 208 at which the mirrored packet is processed. In particular, as noted with respect to other embodiments described herein, a transport layer payload (also referred to as a datagram) can be extracted from a payload data unit of the network layer packet received at operation 202. The payload can conform to any suitable transport layer protocol, such as TCP or UDP. Other examples are possible.

Next, at operation 210, a validation operation can be performed. In particular, the datagram/data payload extracted at operation 208 can be analyzed to determine what protocol it conforms to. Thereafter, a checksum validation operation selected based on the datagram type can be performed to determine whether the packet mirrored at operation 204 contains a transport layer error.

If the payload passes checksum validation, the mirrored packet can be discarded and/or otherwise removed from memory. Alternatively, if the payload fails checksum validation, the method 200 can advance to operation 212 at which a dropped packet metric and/or other suitable metric can be updated, typically increased.

In this manner and as a result of this method, an IPv6 packet that contains an error identified at the network layer by a checksum in its payload can be detected by a network layer appliance and can be tallied as an IPv4 dropped packet. In this manner, the network appliance can continue to be managed by a network management system that leverages statistics such as dropped packet rates for management purposes. For example, such a system may power cycle a network appliance that is dropping packets at a high rate, may disconnect and/or reestablish one or more links associated with a high packet drop rate, and so on. As may be appreciated by a person of skill in the art, an IPv4 packet drop rate (or any other similar statistics) updated as described herein can include information derived from IPv4 and IPv6 errors and, in that manner, provides a more complete view of a quantity of packets—regardless of protocol—that contain errors. Once drop rates exceed and/or otherwise satisfy one or more thresholds, alarms can be generated and/or workflows can be triggered. These alarms and triggered workflows enable faster action to prevent error-prone packet sources, links, or destinations from being allocated bandwidth in a packet switching network.

FIG. 3 is a flowchart depicting example operations of a method of sampling IPv6 packets received at an input of a network appliance in a packet switching network, such as described herein. The network appliance can be configured as described above with reference to FIGS. 1-2; this description is not repeated.

The method 300 includes operation 302 in which a packet is received at an input of a network appliance and forwarded to a destination defined by a destination address. The example operation 302 can be performed, in whole or in part, by a network appliance such as a router or a switch.

The method 300 includes operation 304 at which it is determined that an interval has lapsed since a previous sample of input (received) packets occurred. As noted above, an interval expiration is merely one example of a method operation by which a system as described herein can leverage to collect a subsequent sample. In other cases, subsequent samples can be collected at specific times, on demand, at particular sample-count rates, and so on.

The method 300 further includes operation 306 at which a sample of an IPv6 packet is taken. In particular, the next packet received after operation 304 is mirrored as a duplicated packet and added to a processing queue or other memory structure. In this manner, IPv6 packets can be inspected without delaying forwarding and/or routing of packets received by the network appliance.

FIG. 4 is a flowchart depicting example operations of a method of processing sampled IPv6 packets to recover bandwidth in a packet switching network. The method 400 can be operated in parallel with the method 300 described in reference to FIG. 3. In some cases, the methods 300 and 400 can be performed by the same network appliance and/or the same processor of the same network appliance. However, this is not required. In other architectures, the method 300 can be performed by a first processor of a network appliance whereas the method 400 can be performed by a second processor of the same network appliance. In other examples, the method 300 can be performed by a first network appliance and the method 400 can be performed by a second network appliance communicably coupled to the first network appliance. These foregoing example architectures are not exhaustive.

The method 400 includes operation 402 at which a packet, having previously been created as a duplicated packet mirroring a packet received by a network appliance, is selected from a memory structure storing such duplicated packets. As with the method 300, any suitable memory structure may be used and can include one or more caches, queues, databases, and so on. For simplicity of description and illustration, the method embodiment depicted in FIG. 4 is described in reference to a processing queue. Accordingly, at operation 402, a duplicated packet may be popped from the processing queue.

Once a duplicate packet is obtained at operation 402, the method 400 advances to operation 404 at which a transport layer payload of that packet can be extracted. Once the payload is extracted and it is determined to which transport layer protocol the packet conforms, a checksum validation operation can be carried out. As noted with respect to other embodiments described herein, a checksum validation operation can be performed in a number of ways and may be protocol dependent. In some embodiments, a checksum validation operation is carried out by performing a ones' complement summation of all header fields of a particular extracted payload to determine whether that sum equals 0xFFFF. In other cases, the ones' complement of the sum itself may be calculated to determine whether a resulting value equals 0x0000. In yet further embodiments, a checksum validation can be performed in another manner.

In some embodiments, a checksum validation can be performed in hardware, such as with shift registers and purpose-configured circuitry. In other cases, checksum validations can be performed by software.

In many cases, a checksum validation operation passes meaning that no errors are predicted by checksum validation. In such examples, the method 400 can drop or otherwise discard the duplicate packet obtained at operation 402.

Alternatively, if an error is detected, the method 400 advances to operation 406 at which, in response to the detected failed packet, a metric internal to or otherwise associated with the network appliance can be updated. An example metric that can be updated at operation 406 is a dropped packet rate.

Optionally, the method 400 can advance thereafter to operation 408. At operation 408, it may be determined whether the metric updated at operation 406 exceeds or otherwise satisfies a threshold. For example, a dropped packet rate updated at operation 406 can be compared against an acceptable dropped packet threshold. In response to determining that the threshold has been satisfied, the method 400 can perform a task such as throttling packets from the source.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As used herein, the terms "networking resource" and/or "computing resource" (along with other similar terms and phrases, including, but not limited to, "network appliance" and "computing network") refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

What is claimed is:

1. A method for reducing bandwidth waste when operating a network appliance in a computer network, the method comprising:
receiving a packet at an input of the network appliance;
mirroring the packet to a working memory as a duplicate packet;
forwarding the packet to a destination address of the packet; and
after the forwarding of the packet to the destination address of the packet:
extracting a transport layer payload from the duplicate packet;
verifying an extracted checksum for the transport layer payload to determine whether an error is present;
in response to determining that the error is present, updating a dropped packet rate of the network appliance; and
sending an instruction to the network appliance to change an operational parameter upon determining that the dropped packet rate exceeds a threshold;
wherein the instruction causes the network appliance to throttle packets from a particular source.

2. The method of claim 1, wherein the network appliance reboots if the dropped packet rate exceeds the threshold.

3. The method of claim 1, wherein the network appliance performs the operations of forwarding the packet and verifying the extracted checksum.

4. The method of claim 1, wherein the network appliance is operable to route packets using Internet Protocol version 6 (IPv6).

5. The method of claim 1, wherein the network appliance determines to extract the transport layer payload from the duplicate packet after determining that the network appliance is idle.

6. The method of claim 1, wherein a single device performs the operations of forwarding the packet and verifying the extracted checksum.

7. The method of claim 1, comprising transmitting an alert upon determining that the dropped packet rate satisfies the threshold.

8. The method of claim 1, wherein:
the packet is a first packet;
the extracted checksum is a first extracted checksum;
the error is a first error; and
the method comprises:
receiving a second packet at the input of the network appliance;
verifying a second extracted checksum of a header of the second packet to determine whether a second error is present; and
in response to determining that the second error is present, updating the dropped packet rate of the network appliance.

9. The method of claim 8, wherein the first packet is an Internet Protocol version 6 (IPv6) packet and the second packet is an Internet Protocol version 4 (IPv4) packet.

10. The method of claim 1, wherein the network appliance is operable to route packets using both Internet Protocol version 4 (IPv4) and Internet Protocol version 6 (IPv6).

11. The method of claim 1, further comprising maintaining a dropped packet counter.

12. The method of claim 1, wherein the network appliance is operable to route packets using Internet Protocol version 4 (IPv4).

13. The method of claim 1, wherein the instruction is sent via a network management system.

14. A method for reducing bandwidth waste when operating a network appliance in a computer network, the method comprising:
receiving a packet at an input of the network appliance;
mirroring the packet to a working memory as a duplicate packet;
forwarding the packet to a destination address of the packet; and
after the forwarding of the packet to the destination address of the packet:
extracting a transport layer payload from the duplicate packet;
verifying an extracted checksum for the transport layer payload to determine whether an error is present;
in response to determining that the error is present, updating a dropped packet rate of the network appliance; and
upon determining that the dropped packet rate exceeds a threshold, throttling packets to a particular destination.

15. A method for reducing bandwidth waste when operating a network appliance in a computer network, the method comprising:
receiving a packet at an input of the network appliance;
mirroring the packet to a working memory as a duplicate packet;
forwarding the packet to a destination address of the packet; and
after the forwarding of the packet to the destination address of the packet:
extracting a transport layer payload from the duplicate packet;
verifying an extracted checksum for the transport layer payload to determine whether an error is present; and
in response to determining that the error is present, updating a dropped packet rate of the network appliance; and
upon determining that the dropped packet rate exceeds a threshold, throttling stop transporting data across a particular link.

16. A network appliance, comprising:
a non-transitory storage medium storing instructions; and
a processor that executes the instructions to:
receive a packet at an input of the network appliance;
mirror the packet to a working memory as a duplicate packet;
forward the packet to a destination address of the packet; and
after the forwarding of the packet to the destination address of the packet:
extract a transport layer payload from the duplicate packet;
verify an extracted checksum for the transport layer payload to determine whether an error is present;
in response to determining that the error is present, update a dropped packet rate of the network appliance; and
change an operational parameter upon determining that the dropped packet rate exceeds a threshold;

wherein changing the operational parameter causes the network appliance to at least one of:

throttle packets from a particular source or to a particular destination; or stop transporting data across a particular link.

17. The network appliance of claim 16, wherein the processor transmits an alert upon determining that the dropped packet rate satisfies the threshold.

18. The network appliance of claim 16, wherein the processor is operable to route packets using both Internet Protocol version 4 (IPv4) and Internet Protocol version 6 (IPv6).

19. The network appliance of claim 16, wherein the processor determines to extract the transport layer payload from the duplicate packet after determining that the network appliance is idle.

20. The network appliance of claim 16, wherein the processor maintains a dropped packet counter.

* * * * *